UNITED STATES PATENT OFFICE.

GEORGE F. ORDWAY, OF BOSTON, MASSACHUSETTS, ASSIGNOR TO ALFRED ORDWAY, OF SAME PLACE.

FOOD COMPOUND.

SPECIFICATION forming part of Letters Patent No. 456,903, dated July 28, 1891.

Application filed August 20, 1890. Serial No. 362,536. (No specimens.)

*To all whom it may concern:*

Be it known that I, GEORGE F. ORDWAY, a citizen of the United States, residing at Boston, in the county of Suffolk and State of Massachusetts, have invented certain new and useful Improvements in a Food Candy or Confection, of which the following is a specification.

The object of this invention is to produce a food candy or confection which will not only be pleasant to the taste, but will contain all the essential elements of a perfect food, and which will not be liable to spontaneous change or decomposition.

The essential feature of my invention consists of a food candy or confection containing protein or any of the albuminoids in such proportion as to constitute a true food, in combination with other substances forming part of nutritious foods, as more fully hereinafter specified. Either of these may be used alone or they may be combined, as may be found convenient. The said protein or albuminoids, to produce a food candy or confection, may be combined with a saccharine substance, such as sugar, glucose, molasses, or honey, and other matters common to various foods—such as digestible fats and phosphates—may be combined with the compound of protein, in all instances being such as to give the compound the characteristics of a true food.

To render the compound more palatable or to suit different tastes, various flavoring extracts, essences, or spices may be combined therewith.

The protein may be in the form of finely-ground animal muscle, coagulated albumen, fish-roe, casein, gluten, preferably corn-gluten or legumin, the said corn-gluten or legumin, when such is used, being freed from starch in any convenient manner. These may be employed singly or in various combinations, as may be found convenient to form different varieties of candies or confections.

The various ingredients of the improved candy or confection may be varied indefinitely without departing from the spirit of my invention, so long as the proper relative proportion of the protein is maintained.

The following proportions I have found to answer well in practice, viz: protein, forty-four ounces; fat, forty-four ounces; sugar, one hundred and forty-four ounces; phosphate of soda, two ounces; carbonate of magnesia, two ounces; oil of peppermint, one hundred drops. The sugar is first dissolved in sufficient water and the solution boiled for a sufficient length of time to convert the same into candy, as usual. The mass is then allowed to partially cool; but before being fully cooled and while in a plastic state the other ingredients are worked into the mass until thoroughly incorporated therewith. The mass may be then heated as ordinary candy and formed into various shapes, as usual, in the manufacture of candies and similar confections.

Any other suitable process of combining the materials may be adopted at the option of the maker.

Having thus described my invention, what I claim, and desire to secure by Letters Patent, is—

1. A food-candy consisting of a protein substance, fat, sugar, phosphate of soda, carbonate of magnesia, and flavoring material, combined in about the proportions named.

2. A food-candy consisting of a finely-ground protein substance, fat, sugar, and phosphate of soda, all intimately united to form a homogeneous compound, substantially as described.

In testimony whereof I affix my signature, in presence of two witnesses, this 19th day of August, 1890.

GEORGE F. ORDWAY.

Witnesses:
    WALLACE F. FLANDERS,
    CHAS. M. TILLINGHAST.